United States Patent [19]

Rosenthal

[11] Patent Number: 5,635,556
[45] Date of Patent: Jun. 3, 1997

[54] THERMOPLASTIC RESIN COMPOSITIONS HAVING IMPROVED PERFORMANCE

[75] Inventor: Jay S. Rosenthal, West Chester, Pa.

[73] Assignee: Nova Chemicals Inc., Leominster, Mass.

[21] Appl. No.: 431,563

[22] Filed: May 1, 1995

Related U.S. Application Data

[62] Division of Ser. No. 274,592, Jul. 13, 1994, abandoned.

[51] Int. Cl.$^6$ .............................. C08K 3/26; C08J 11/06
[52] U.S. Cl. .................... 524/427; 524/425; 524/426; 521/40.5; 521/46.5; 525/207
[58] Field of Search .................. 521/40.5, 46.5; 524/425, 426, 427

[56] References Cited

U.S. PATENT DOCUMENTS

| | | | |
|---|---|---|---|
| 4,311,806 | 1/1982 | Dufour | 525/71 |
| 4,371,666 | 2/1983 | Bourland | 525/207 |
| 4,454,300 | 6/1984 | Ranade et al. | 525/71 |
| 4,469,844 | 9/1984 | Doak | 525/71 |
| 4,469,845 | 9/1984 | Doak | 525/71 |
| 4,506,049 | 3/1985 | Mueller et al. | 525/74 |
| 5,034,443 | 7/1991 | Bae et al. | 524/425 |
| 5,169,574 | 12/1992 | Leung et al. | 264/40.5 |
| 5,207,957 | 5/1993 | Ideath et al. | 264/40.5 |
| 5,300,531 | 4/1994 | Weaver | 521/51 |

FOREIGN PATENT DOCUMENTS

| | | |
|---|---|---|
| 1063694 | 8/1992 | China . |
| 0260820 | 3/1988 | European Pat. Off. . |
| 56-062582 | 5/1981 | Japan ................... 521/40.5 |
| 9215640 | 9/1992 | WIPO . |
| 9407950 | 4/1994 | WIPO . |

OTHER PUBLICATIONS

Plastics Additives Handbook. R. Gachter and H. Müller. Hanser/Gardner Publications. 4th Ed. (1993). pp. 534–535.
Derwent Pub. Ltd., London, GB; AN 87–083930 [12] & JP-A-62 035 806 (Mitsubishi Motor Corp.) 16 Feb. 1987.
Derwent Pub. Ltd., London, GB; AN 84–156087[25] & JP-A-59 083 618 (Mitsubishi Belting KK) 15 May 1984.

*Primary Examiner*—David Buttner
*Attorney, Agent, or Firm*—Kenneth H. Johnson

[57] ABSTRACT

A heat resistant polymer such as a styrene maleic anhydride copolymer which has been contaminated with a minor amount of a vinyl chloride polymer such as polyvinyl chloride may be stabilized sufficiently by incorporation of calcium carbonate to allow contaminated heat resistant polymer reclaimed in this manner to match the performance of non-contaminated heat resistant polymer. Instrument panels comprising such heat resistant polymers and polyvinyl chloride polymers may thus be readily recycled and reused to form new molded articles exhibiting with little or no deterioration in properties.

15 Claims, No Drawings

THERMOPLASTIC RESIN COMPOSITIONS HAVING IMPROVED PERFORMANCE

This is a division of application Ser. No. 08/274,592, filed on Jul. 13, 1994 now abandoned.

FIELD OF THE INVENTION

This invention pertains to compositions containing heat resistant polymers which have been contaminated with low levels of a vinyl chloride polymer such as polyvinyl chloride. More specifically, the invention relates to enhancing the performance of such contaminated compositions by incorporating calcium carbonate therein. Contaminated compositions reclaimed in this manner exhibit properties equivalent to those of the virgin (non-contaminated) thermoplastic rosins and may be readily processed without causing accelerated machine and mold wear due to the generation of acidic by-products.

BACKGROUND OF THE INVENTION

In recent years, the recycling or reclamation of construction materials has become of increasing interest in view of the perceived need to conserve landfill space and non-renewable resources such as petroleum. By their nature, thermoplastic polymers are inherently recyclable in principle since they are materials with non-crosslinked macromolecular structures which will repeatedly soften when heated and reharden when cooled. Waste or scrap thermoplastic polymers thus may theoretically be reshaped into useful molded articles. In practice, however, great care must be taken to segregate waste streams by polymer type since the presence of even minor amounts of one polymer in another may significantly degrade the physical and mechanical properties of the dominant polymer. Polymeric contaminants thus frequently prevent recycled polymers from being used interchangeably with virgin resins due to their adverse effect on quality.

An example of this is found in the reclamation of interior trim parts from automobiles and other vehicles which have been produced using a heat resistant polymer such as a styrene maleic anhydride copolymer or polyphenylene ether. It is common practice to place an outer skin on instrument panels and the like to enhance appearance. An intermediate layer such as a urethane foam may also be present to provide padding. The outer skin differs in composition from the underlying substrate and frequently contains a vinyl chloride polymer such as polyvinyl chloride compounded with plasticizers, colorants, and other additives. After the trimming operations common to instrument panel manufacture or after the instrument panel has been removed from the vehicle at the end of its useful service life, the heat resistant polymer could in theory be formed into new trim parts by grinding or chopping into small particles and then remolding those particles by injection molding techniques. However, it is exceedingly difficult to remove essentially all of the outer skin from the trim part prior to such reuse through the use of solvent or mechanical separation means. The heat resistant polymer thus, for all practical purposes, is invariably contaminated with small amounts of polyvinyl chloride.

Such contamination makes direct recycling of the heat resistant polymer impractical. The heat resistant polymer must be processed and molded at relatively high temperatures. The vinyl chloride polymer contaminant is unstable at such elevated temperatures and tends to thermally degrade. This degradation adversely affects certain physical properties of the heat resistant thermoplastic polymer such as tensile strength/toughness and flex strength/toughness. Moreover, the acidic byproducts generated by the degradation of the vinyl chloride polymer accelerate machine and mold wear.

As a result, there exists a need for methods whereby a heat resistant thermoplastic polymer contaminated with a vinyl chloride polymer such as polyvinyl chloride may be processed to provide a recycled resin composition at least equivalent in performance to non-contaminated polymer.

SUMMARY OF THE INVENTION

The present invention provides a polymeric composition comprising 100 parts by weight of a thermoplastic resin comprised of a heat resistant polymer (preferably, one having a glass transition temperature greater than 100° C.), from 0.01 to 5 parts by weight of a vinyl resin comprised of a vinyl chloride polymer, and from 0.01 to 5 parts by weight calcium carbonate. At least a portion of the thermoplastic resin is reclaimed. The invention additionally furnishes a method of enhancing the performance of a reclaimed thermoplastic resin contaminated with from 0.01 to 5 parts by weight, per 100 parts by weight thermoplastic resin, of a vinyl resin comprised of a vinyl chloride polymer, wherein the thermoplastic resin is comprised of a heat resistant polymer, said method comprising incorporating from 0.01 to 5 parts by weight calcium carbonate per 100 parts by weight reclaimed thermoplastic resin and at least 0.25 part by weight calcium carbonate per part by weight vinyl resin into said reclaimed thermoplastic resin.

In one desirable embodiment, the invention also provides a composition comprising 100 parts by weight of a reclaimed thermoplastic resin comprised of a styrene maleic anhydride copolymer, from 0.1 to 2 parts by weight at a vinyl resin comprised of polyvinyl chloride at least 0.1 parts by weight of finely divided calcium carbonate having an average particle size of from 0.07 to 100 microns, and, optionally, a virgin thermoplastic resin, wherein at least 0.5 part by weight calcium carbonate per part by weight vinyl resin is present.

DETAILED DESCRIPTION OF THE INVENTION

This invention is useful for recycling or reclaiming vinyl chloride polymer contaminated thermoplastic resins from both preconsumer and postconsumer sources. Preconsumer sources include the scraps generated by a manufacturer in trimming a molded article or forming openings in such articles as well as complete molded articles which do not meet manufacturing specifications. Postconsumer sources include molded articles removed from automobiles, appliances, and the like which have reached the end of their useful service life.

The compositions provided by this invention contain a thermoplastic resin comprised of a heat resistant polymer selected from random styrenic copolymers, aromatic polycarbonates, SAN resins, ABS resins, polyphenylene oxides, and mixtures thereof. The thermoplastic resin component may contain other materials as well in addition to the heat resistant polymer, including, for example, any of the conventional plastic additives such as fillers (including glass fibers and the like), colorants, antioxidants, plasticizers, stabilizers and the like.

Suitable random styrenic copolymers include polymeric substances which, in polymerized form, are comprised of from about 50 to 99 weight percent of a vinyl aromatic monomer, from about 1 to 30 weight percent of an unsaturated dicarboxylic acid derivative, and, optionally, up to about 40 weight percent of a copolymerizable ethylenically unsaturated monomer. It is preferred that the random styrenic copolymer be comprised of from about 70 to 95 weight percent vinyl aromatic monomer and from about 5 to 30 weight percent unsaturated dicarboxylic acid anhydride.

Although any suitable vinyl aromatic monomer may be employed in the random styrenic copolymer, styrene is the preferred monomer because of its low cost and availability. Examples of other vinyl aromatic monomers which can be used include, but are not limited to, ar-methyl styrene, ar-ethyl styrene, ar-tert-butyl styrene, ar-chloro styrene, alpha-methyl styrene, divinyl benzene, vinyl benzyl chloride, and vinyl naphthalene, as well as other alkyl- or halo-substituted styrenes. Mixtures of vinyl aromatic monomers can be used.

The preferred unsaturated dicarboxylic acid derivative is an unsaturated dicarboxylic acid anhydride. Exemplary unsaturated dicarboxylic acid anhydrides include itaconic anhydride, citraconic anhydride, ethyl maleic anhydride, methyl itaconic anhydride, chloromaleic anhydride, brommaleic anhydride, tetrahydrophthalic anhydride, and, most preferably, maleic anhydride. However, other $\alpha,\beta$-unsaturated dicarboxylic acid derivatives may also be employed including $\alpha,\beta$-unsaturated dicarboxylic acids such as maleic or fumaric acid and maleimides such an N-methyl maleimide, N-phenyl maleimide, N-tribromophenyl maleimide, and the like. If desired, mixtures of $\alpha,\beta$-unsaturated dicarboxylic acid derivatives can be used.

The optional copolymerizable ethylenically unsaturated monomer may be selected from the group consisting of unsaturated nitriles (e.g., acrylonitrile and methacrylonitrile), unsaturated carboxylic acids (e.g., acrylic acid and methacrylic acid), unsaturated carboxylic acid esters (especially $C_1$–$C_4$ alkyl esters such as methyl methacrylate and ethyl acrylate), and mixtures thereof. Terpolymers of styrene, maleic anhydride, and acrylonitrile or styrene, maleic anhydride, and methyl methacrylate are particularly preferred.

In the most preferred embodiment of this invention, the random styrenic copolymer is a copolymer of styrene and maleic anhydride. The random styrenic copolymer preferably has a number average molecular weight of from about 30,000 to 500,000 and a melt flow rate (Condition L) of from about 0.1 to 10 g/10 min.

Rubber-modified random styrenic copolymers may also be employed. Such copolymers preferably contain from about 1 to 35 (more preferably, from about 5 to 25) weight percent of an elastomer. The elastomer is preferably selected from the group consisting of conjugated diene elastomers and ethylene-propylene-diene monomer elastomers.

Conjugated diene elastomers suitable for use as the elastomer preferably contain at least about 50 weight percent of a conjugated diene and have glass transition temperatures less than about 0° C. (more preferably, less than about –20° C.). Such rubbers include homopolymers, random copolymers, and block copolymers of conjugated 1,3-dienes such as 1,3-butadiene (a preferred diene), isoprene, chloroprene, 1,3-pentadiene, 2,3-dimethyl-1,3-butadiene, and the like. The conjugated diene elastomer is preferably selected from the group consisting of mono-vinyl aromatic monomer/-conjugated diene block copolymers, mono-vinyl-aromatic monomer/conjugated diene random copolymers, conjugated diene homopolymers, and mixtures thereof.

The conjugated diene elastomer may contain one or more copolymerizable ethylenically unsaturated comonomers. Most preferably, the comonomer is a mono-vinyl aromatic monomer such as styrene, ar-methyl styrene, ar-ethyl styrene, ar-tert-butyl styrene, ar-chlorostyrene, alpha-methyl styrene, vinyl benzyl chloride, vinyl naphthalene, and the like and mixtures thereof. Other copolymerizable ethylenically unsaturated monomers may be employed, however, including unsaturated nitrile monomers such as acrylonitrile and methacrylonitrile, alkyl acrylates such as methyl methacrylate, methyl acrylate, butyl acrylate, or 2-ethylhexyl methacrylate, acrylamides such as acrylamide, methacrylamide, or butylacrylamide, unsaturated ketones such as vinyl methyl ketone or methyl isopropenyl ketone, a-olefins such as ethylene or propylene, vinyl esters such as vinyl acetate or vinyl stearate, vinyl heterocyclic monomers such as vinyl pyridine, vinyl and vinylidene halides such as vinyl chloride or vinylidene chloride, and the like and mixtures thereof. In a preferred embodiment of this invention, the comonomer used in combination with the 1,3-conjugated diene is the same as the vinyl aromatic monomer component of the random styrenic copolymer.

Exemplary conjugated diene elastomers suitable for grafting onto the random thermoplastic copolymer include styrene/butadiene and styrene/isoprene block copolymers. Such block copolymers may be linear, radical, or branched in structure. Linear block copolymers may have an ABA, $AB(AB)_nA$, $(AB)_n$, or similar structure wherein A represents a block of the monovinyl aromatic monomer, B represents a block of the conjugated diene and n is an integer of 1 to 10. Radical block copolymers may have an $(AB)_n$ X structure, wherein X is a multi-valent linking agent. Block copolymers of these types are well-known. Details concerning their preparation, structure, and properties may be found, for example, in the following references: "Styrene-Diene Block Copolymers" *Encyclopedia of Polymer Science and Technology* 1st Ed., Suppl., Wiley, pp 508–530 (1971), K. E. Snavely et al, *Rubber World* 169, 45(1973), and "Thermoplastic Elastomers" *Kirl-Othmer Encyclopedia of Chemical Technology* 3rd. Ed., Vol. 8, Wiley-Interscience, pp 627–632 (1981).

The following U.S. patents, incorporated herein by reference, further describe such block copolymer conjugated diene elastomers: U.S. Pat. Nos. 3,937,760, 3,231,635, 3,265,765, 3,198,774, 3,078,254, 3,244,644, 3,280,084, 3,954,452, 3,766,301, 3,281,383, 4,640,968, 4,503,188, 4,485,210, 4,390,663, 4,271,661, and 4,346,193. Suitable block copolymers are also presently available from commercial sources. Examples of commercially available block copolymer elastomers include "Stereon 840A" (a linear graded styrene/butadiene multi-block copolymer containing about 43% styrene and having a number average molecular weight of about 60,000, sold by Firestone Synthetic Rubber and Latex Co.), "Stereon 730A" (a stereospecific tapered styrene/butadiene block copolymer containing a total of 30% styrene with 21% styrene in block form and having a number average molecular weight of 140,000, sold by Firestone Synthetic Rubber and Latex Company), "Kraton D-1101" (a linear styrene/butadiene/styrene triblock copolymer containing 31% styrene, sold by Shell Chemical), "Kraton D-1107" (a linear styrene/isoprene/styrene triblock copolymer containing 14% styrene, sold by Shell Chemical), "Kraton D-1107" (a linear styrene/isoprene/styrene triblock copolymer containing 14% styrene, sold by Shell Chemical), and "Kraton D-1184" (a branched styrene/butadiene multi-block copolymer containing 30% styrene, sold by Shell Chemical).

Also suitable for use as conjugated diene elastomers in the rubber-modified styrenic resin component of this invention are random copolymers of mono-vinyl aromatic monomers and conjugated dienes. A particularly preferred conjugated diene elastomer of this type is styrene/butadiene rubber (SBR). Homopolymer of conjugated dienes such as polybutadiene and polyisoprene may also be employed as the grafted rubber. All such rubbers are well-known in the art and are described, for example, in "Butadiene Polymers" *Encyclopedia of Polymer Science and Engineering* 2nd Ed., Wiley-Interscience, Vol. 2, pp. 537–590(1988), the teachings of which are incorporated by reference herein in their entirety.

The grafted elastomer may alternatively be an ethylene propylene diene monomer (EPDM) rubber. Such materials are well-known in the art and are random copolymers of ethylene, at least one $C_3$–$C_6$ α-olefin (preferably propylene), and at least one nonconjugated diene. The nonconjugated diene may be a linear aliphatic diene of at least six carbon atoms which has either two terminal double bonds or one terminal double bond and one internal double bond. Alternatively, the nonconjugated diene may be a cyclic diene where one or both of the double bonds are part of a carbocyclic ring. The structure of the EPDM rubber may be altered as desired, particularly with respect to branching, by the selection of particular nonconjugated dienes as is well known in the art. Particularly preferred nonconjugated dienes include 1,4-hexadiene, dicyclopentadiene, vinyl norbornene, norbornadiene, and 5-ethylidene-2-norbornene. Preferably, the EPDM elastomer contains from about 40 to 90 mole percent ethylene and 0.1 to 7.5 mole percent nonconjugated diene, with the remainder being propylene. Additional information regarding EPDM elastomers may be found in "Ethylene-Propylene Elastomers" *Encyclopedia of Polymer Science and Engineering* 2nd Ed., Wiley-Interscience, Vol. 6, p. 522–564(1986), the teachings of which are incorporated herein by reference.

The random styrenic copolymers useful in the compositions of this invention may be prepared by any of the several methods available for their synthesis. For example, the copolymers may be obtained by solution copolymerization directly from the respective monomers by the incremental addition of the more reactive monomer as taught by U.S. Pat. No. 2,971,939 or by a continuous recycle polymerization process described in U.S. Pat. Nos. 2,769,804 and 2,989,517. Alternatively, a suspension polymerization process as taught in U.S. Pat. No. 3,509,110 may be employed. Rubber-modified random styrenic copolymer may be prepared by incorporation of the elastomer into the monomer mixture prior to polymerization using, for example, the methods of U.S. Pat. Nos. 4,097,551 and 3,919,354. Post-synthesis blending of all or part the elastomer into the random styrenic copolymer is also feasible. The teachings of all these patents are incorporated herein by reference. Suitable commercially available random styrenic copolymers include the "Dylark" styrene/maleic anhydride resins produced by ARCO Chemical Company, as well as the "Stapron" resins produced by DSM and the "Cadon" resins produced by Monsanto.

The term "polyphenylene oxide" (used interchangeably herein and in the art with the term "polyphenylene ether") is well known as defining a class of heat resistant polymers. See, for example, the article by Aycode et al. entitled "Poly (phenylene) Ether", which appears in the *Encyclopedia of Polymer Science & Engineering,* Vol. 13, pp. 1–30 (1988).

While any polyphenylene oxide resin may be employed in the compositions of the present invention, preferred are homo- and copolymeric resins having the formula:

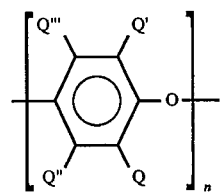

wherein the oxygen ether atom of one unit is connected to the benzene nucleus of the next adjoining unit, n represents the number of monomer units and is a positive integer of at least 50, e.g., from 50 to about 200, and Q, Q', Q", and Q'" are independently selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Still more preferably, within the above formula Q and Q' are alkyl, especially alkyl having from 1 to 4 carbon atoms. Illustratively, such resins include poly(2,6-dimethyl-1,4-phenylene)ether; poly(2,6-diethyl-1,4-phenylene)ether; poly (2-methyl-6-ethyl-phenylene)ether; poly(2-methyl-6-propyl-1,4-phenylene)ether; poly(2,6-dipropyl-phenylene) ether; poly(2-ethyl-6-propyl 1,4-phenylene)ether; and the like.

Especially preferred is poly(2,6-dimethyl-1,4-phenylene) ether, preferably having an intrinsic viscosity of from about 0.4 to 0.8, more preferably about 0.45 deciliters per gram (dl/g.) measured in solution in chloroform at 30° C.

These polyphenylene oxides also may desirably contain styrene resin to improve their physical properties. Suitable styrene resins are those having at least 25% by weight of repeating units derived from a vinyl aromatic compound of the formula:

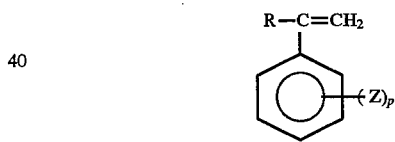

wherein R is hydrogen, (lower)alkyl or halogen; Z is vinyl, halogen or (lower)alkyl; and p is 0 or an integer from 1 to the number of replaceable hydrogen atoms on the benzene nucleus. Herein, the term "(lower)alkyl" means alkyl of from 1 to 6 carbon atoms.

The term "styrene resin" includes, by way of example, homopolymers such as polystyrene and polychlorostyrene, as well as polystyrenes which have been modified by natural or synthetic rubber (HIPS), e.g., polybutadiene, polyisoprene, butyl rubber, EPDM rubber, ethylene propylene copolymers, natural rubber, polysufide rubbers, polyurethane rubbers, epichlorohydrin, and the like; styrene containing copolymers such as the styrene-acrylonitrile copolymers (SAN), styrene-butadiene copolymers, styrene-maleic anhydride copolymers, styrene-acrylonitrile-butadiene terpolymers (ABS), poly-alphamethylstyrene, copolymers of ethylvinylbenzene and divinylbenzene, and the like; block copolymers of the A-B-A and A-B type wherein A is polystyrene and B is an elastomeric diene, e.g., polybutadiene, radial teleblock copolymers of styrene and a conjugated diene, acrylic resin modified styrenebutadiene resins and the like, and blends of homopolystyrene and copolymers of the aforementioned types.

The styrene resin may be present in any amount. Widely divergent proportions of from 1:99 to 99:1 by weight of polyphenylene oxide resin are known. More desirably the respective styrene and polyphenylene ether resins are in a weight ratio of from about 2:1 to 1:20, most preferably about 1:4, for use in the present compositions.

Methods of preparing polyphenylene oxide resins are known in the art and described in the patent literature, e.g., Hay, U.S. Pat. Nos. 3,306,874, and 3,306,875 and Stamatoff, U.S. Pat. No. 3,257,358, incorporated by reference to save unnecessary detail. Other patents which show the preparation of polyphenylene oxide resins include Bennett and Cooper, U.S. Pat. Nos. 3,369,656 and 3,838,102, as well as Cooper and Bennett, U.S. Pat. Nos. 3,642,699, and 3,733,299, also incorporated herein by reference.

Polyphenylene oxide resins also readily available from commercial sources, including General Electric ("Noryl" resins). "Noryl GTX" resins, which are alloys of poly(2,6-dimethyl-1,4-phenylene ether) and a polyamide such as nylon 6 or nylon 6,6, are also suitable for use as the polyphenylene oxide component.

Aromatic polycarbonates may also be used as the heat resistant polymer component. Such materials are well known in the field and are generally described, for example, in Freitag et al., "Polycarbonates," *Encyclopedia of Polymer Science and Engineering*, Vol. 11, pp. 650–718 (1988). Aromatic polycarbonates are typically prepared by the interfacial polymerization of bisphenols such as bisphenol A and either phosgene or diphenyl carbonate. Commercial suppliers of suitable aromatic polycarbonates include Dow Chemical ("Calibre" resins), GE Plastics ("Lexan" resins), Mobay Corp. ("Apec" resins), and Rohm & Haas ("Tuffak" resins). The aromatic polycarbonate may be blended with another polymeric substance such as polyethylene, ABS, polyalkylene terephthalate, or a styrene maleic anhydride copolymer.

Also useful as the heat resistant polymer is the class of resins commonly referred to as acrylonitrile-butadiene-styrene (ABS) polymers such as those described in Kulich et al., "Acrylonitrile-Butadiene-Styrene Polymers", *Encyclopedia of Polymer Science and Engineering*, Vol. 1, pp. 388–426 (1985). The high heat ABS grades are especially advantageous for use in the present invention. ABS polymers may be obtained commercially from Dow Chemical ("Magnum" resins), Monsanto ("Lustran ABS" resins) and GE Plastics ("Cycolac" resins).

Styrene-acrylonitrile (SAN) resins may also be utilized as the heat resistant polymer. Such resins are typically copolymers of styrene and acrylonitrile or analogous monomers and are described, for example, in Peng, "Acrylonitrile Polymers", *Encyclopedia of Polymer Science and Engineering*, Vol. 1, pp. 452–464 (1988). Commercial grades of SAN polymers include "Tyril" resins (Dow Chemical) and "Lustran SAN" resins (Monsanto).

The vinyl resin component is comprised of a vinyl chloride polymer such as polyvinyl chloride or chlorinated polyvinyl chloride. Vinyl chloride polymers and vinyl resins prepared therefrom are well known in the art and are described, for example, in "Vinyl Chloride Polymers", *Encyclopedia Polymer Science & Engineering*, Supplement pp. 858–884 (1989) and Davidson et al., "Vinyl Polymers (PVC)", *Kirk-Othmer Encyclopedia of Chemical Technology*, 3rd Ed., Vol. 23, pp. 886–936 (1983). Such materials are formed by the polymerization of vinyl chloride monomer, either alone or with a comonomer such as other unsaturated halogenated hydrocarbons (e.g., vinylidene chloride), styrene and halogenated styrenes, vinyl esters and ethers (e.g., vinyl acetate, vinyl isobutyl ether), olefins (e.g., propylene), dienes, unsaturated nitriles (e.g., acrylonitrile), esters and other derivatives of acrylic and methacrylic acid (e.g., 2-ethyl hexyl acrylate), olefinic dicarboxylic acids and esters, and the like. The vinyl chloride polymer may be impact modified with a modifier such as MBS, ABS, acrylic rubber, chlorinated polyethylene, EVA copolymer, or the like. In addition to the vinyl chloride polymer, the vinyl resin component may contain plasticizers, lubricants, antistatic agents, pigments, flame or fire retardants, stabilizers, high polymeric processing aids, other polymers, and the like. Typically, the vinyl resin will be comprised of from about 20 to 60 weight percent vinyl chloride polymer. Suitable vinyl resins are available from commercial sources such as B. F. Goodrich ("Geon" resins).

The calcium carbonate may be any of the various finely divided grades conventionally used as fillers or reinforcements for plastics and preferably has a particle size of from 0.07 to 100 microns. Natural or synthetic calcium carbonate may be utilized, including purified ground $CaCO_3$, dry processed $CaCO_3$, precipitated $CaCO_3$, and the like. It is critical to incorporate a sufficient amount of $CaCO_3$ into the thermoplastic resin and vinyl resin so as to prevent any significant loss in physical or mechanical properties when the latter two components are melt processed at elevated temperature. While from 0.01 to 5 parts by weight $CaCO_3$ per 100 parts by weight thermoplastic resin may be utilized, in generally it will be highly advantageous to have a calcium carbonate level at least roughly equal to the concentration of the vinyl resin present. Preferably, at least 0.25 parts by weight (more preferably, at least 0.5 parts by weight) calcium carbonate per part by weight vinyl resin is present.

In one embodiment, the present invention is useful in reclaiming a vinyl resin skin cladded thermoplastic polymer comprising a vinyl resin skin and a substrate of molded thermoplastic resin comprised of the heat resistant polymer. The skin may be adhered directly to the substrate, or, alternatively, to a layer of polyurethane foam or the like (which provides padding) which in turn is attached to the substrate. A barrier film and/or adhesive may also be present between the polyurethane foam layer and the substrate. The vinyl resin skin performs at least two functions. The first is to provide a suitable "show surface", where the cladded thermoplastic polymer is to be visible when in use. For example, the cladded thermoplastic polymer may be formed into an instrument panel for automotive application. The outer texture and color of the instrument panel should match the other similar surfaces of the automobile interior. By using a vinyl resin comprised of a vinyl chloride polymer to cover the outer surface of the underlying substrate containing a layer of thermoplastic resin and (optionally) other layers such as a polyurethane foam layer, the desirable properties of the thermoplastic resin layer such as rigidity can be retained while the vinyl resin is colored and textured to match other trim parts such as door panel moldings. The vinyl resin skin can also be employed to protect the substrate from damaging environmental conditions such as moisture and ultraviolet radiation. An adhesive may be utilized to bond the vinyl resin skin, thermoplastic resin substrate, and polyurethane foam layers to each other, while in certain instances the layers may be attached directly. This invention also has the advantage of substantially improving the performance of a recyclate containing such an adhesive; which, if solvent-based, otherwise tends to embrittle the thermoplastic resin. The vinyl resin skin will typically be a thin film having a thickness of from about 0.05 mm to about 0.5 mm, whereas the thermoplastic resin substrate generally will be substantially thicker (typically, 1 to 5 mm).

To reclaim the vinyl resin skin cladded thermoplastic polymer, the molded article comprised of the composite is preferably first physically removed or separated from other articles of dissimilar composition which may be present. For example, where the molded article is an automobile instrument panel installed in a finished vehicle, the bolts, screws, or other fasteners holding the panel in place are unfastened and the panel taken out of the automobile to be scrapped. Other components such as gauges and the like should be removed from the instrument panel. The molded article separated in this manner then is converted into particulate form to facilitate separation and recycling back into a molded article in combination with calcium carbonate and, generally, virgin thermoplastic resin. A variety of size reduction means are well known in the art and any such suitable means may be employed in this invention. For example, the molded article can be subjected to a shredding, chopping, crushing, grinding, or pulverization operation. If desired, the molded article may first be treated so as to remove a portion of the vinyl resin skin by mechanical or other such means, but one important advantage of this invention is that such further pretreatment is not necessary in order to reclaim the thermoplastic resin. The average diameter of the particles obtained from the molded article should preferably be less than about 2 cm, but more preferably is from about 5 to 15 mm. The particles will typically contain about 0.01 to 5 parts by weight of vinyl resin per 100 parts by weight of the thermoplastic resin.

In one embodiment, which is particularly desirable where the molded article contains a polyurethane foam layer intermediate to the vinyl resin skin and the thermoplastic resin layer, the particles are subjected to a separation process in order to obtain a more highly pure recyclate. Suitable separation processes for this purpose include solvent and mechanical based processes. Air classification and hydrocyclones typify the mechanical separation processes. Solvent separation processes include the process described in German Pat. Application P 4033604.2 (laid open Apr. 30, 1992). If a solvent separation process is utilized, a solution of the thermoplastic resin (contaminated with the vinyl resin containing the vinyl chloride polymer) is typically obtained. The thermoplastic resin may be recovered in solid particulate form by removing the solvent by a suitable means such as evaporation or distillation or by a precipitation technique. Such recovered particles may thereafter be compounded with the calcium carbonate.

Calcium carbonate is physically combined with the particles containing the vinyl resin and the thermoplastic resin using an appropriate mixing technique prior to or coincidental with re-melting of the particles. It is critical that the calcium carbonate and the particles be simultaneously present when heating the solid particles so as to form a processable liquified mixture in order to maintain optimum properties in the resulting reclaimed thermoplastic resin.

The particles and the calcium carbonate (either in as-supplied form or in a suitable concentrate also containing thermoplastic resin) may be dry mixed at room temperature or slightly higher temperatures using, for example, dry tumbling of the two components or grinding or milling the particles for more thorough mixing. It will generally be desirable to employ a method which ultimately results in a uniform mixture wherein the calcium carbonate (usually in the form of a fine powder) is brought into intimate contact with the particles. For example, the calcium carbonate may form a thin coating on the surface of the particles. Any suitable type of mixing equipment may be employed such as an intensive internal mixer (e.g., Banbury high shear mixer, Farrel continuous mixer, Plastimat plasticator, turbulent mixer, or roll mill), a dry mixer or blender (e.g., ribbon blender, cone blender, vortical intensive mixer, ball mill, or double planetary mixer), or a rotary tumbler (e.g., drum tumbler, or conical dry blender). The calcium carbonate and particles may be simultaneously mixed and extruded using an extruder such as a single screw extruder, twin screw extruder, or mixer extruder. The product exiting from the extruder may be pelletized or otherwise converted into a form which may be readily handled and further processed. A mixture of calcium carbonate and particles obtained by dry mixing may be similarly extruded and pelletized. The pellets thereby produced then can be formed into molded articles using any of the procedures useful for molding virgin thermoplastic resin (e.g., injection molding, thermoforming, blow molding, extrusion, or foam molding). Direct molding of the particles together with the calcium carbonate may also be practiced. The reclaimed pellets may, if so desired, be blended or combined with pellets of virgin resin prior to such reuse. Typically, the weight ratio of vinyl resin-contaminated (reclaimed) thermoplastic resin to virgin resin in such application will range from 0.1:99.1 to 20:80. In another embodiment, the calcium carbonate may be first combined with virgin thermoplastic resin and the resulting product thereafter blended with the vinyl chloride polymer-contaminated thermoplastic resin particles. Dry tumbling methods will be useful for such purpose.

EXAMPLES

The following examples demonstrate the utility of the invention in improving the properties of a thermoplastic resin contaminated with a polyvinyl chloride-containing resin. In each example, the heat resistant polymer used was Dylark 378P20A, a glass fiber-reinforced styrene maleic anhydride copolymer resin containing minor amounts of acrylic regrind produced by ARCO Chemical Company. The formulations were processed using a single screw extruder at a melt temperature of about 260° C. Comparative Example 1 was prepared using virgin Dylark 378P20A resin only, which was molded as is into ASTM test bar specimens. Comparative Example 2 contained 0.5 weight percent of a vinyl resin in addition to the thermoplastic resin. The vinyl resin containing polyvinyl chloride was introduced in the form of a vinyl skin cut into small pieces using a paper cutter. The vinyl skin pieces were dry blended by hand with the Dylark resin and the resulting blend injection molded into ASTM test bar specimens at a melt temperature of about 250° C. Significant deterioration in tensile strength, elongation, tensile toughness, flex strength, and flex toughness were observed (Table 1). Each of these properties was restored to approximately the same level as in Comparative Example 1 by the addition of 0.8 weight % calcium carbonate, as illustrated in Example 3. The Dylark resin was first compounded with the $CaCO_3$ using a single screw extruder at melt temperature of about 260° C., then combined with the vinyl resin as described for Example 2.

TABLE 1

| Example No. | 1 | 2 | 3 |
|---|---|---|---|
| Vinyl Resin, Wt % | 0 | 0.5 | 0.5 |
| $CaCO_3$, Wt % | 0 | 0 | 0.8 |
| Tensile Strength @ Break (psi) | 11170 ± 151 | 10350 ± 266 | 10940 ± 104 |
| Young's Modulus (ksi) | 942 ± 144 | 1071 ± 197 | 982 ± 168 |

TABLE 1-continued

| Example No. | 1 | 2 | 3 |
|---|---|---|---|
| Elongation @ Break (%) | 2.196 ± .07 | 1.927 ± .17 | 2.218 ± .19 |
| Tensile Toughness (psi) | 159 ± 7 | 130 ± 14 | 158 ± 7 |
| Flex Strength @ Break (psi) | 17510 ± 347 | 16340 ± 665 | 17720 ± 124 |
| Flex Modulus (psi) | 881 ± 20 | 908 ± 8.6 | 923 ± 5.4 |
| Flex Toughness (psi) | 24.7 ± 2 | 20.2 ± 2 | 24.3 ± .9 |

The following example demonstrates that the performance of a post-consumer recyclate obtained by reclamation of styrene maleic anhydride copolymer resin-based instrument panels contaminated with both a vinyl chloride polymer and a solvent-based adhesive may be significantly enhanced using the present invention. The recyclate was obtained from 1982–84 model year automobiles and contained 0.13 weight percent vinyl resin as an impurity. As compared to virgin styrene maleic anhydride copolymer resin of equivalent composition (other than the vinyl resin and adhesive contaminant), the recyclate exhibited inferior properties:

| PROPERTY | % RETENTION |
|---|---|
| Tensile Strength | 81 |
| Tensile Elongation | 74 |
| Flexural Strength | 86 |
| Flexural Modulus | 99 |

Even when combined at only a 10% level with virgin styrene maleic anhydride copolymer resin, the recyclate had an adverse impact on the quality of the resin blend (Example 4). The addition of 1 weight percent calcium carbonate, however, restored the resin blend performance to nearly that of the virgin uncontaminated resin (Example 5):

| COMPOSITION | % BY WEIGHT | |
|---|---|---|
| | EXAMPLE 4 | EXAMPLE 5 |
| Virgin Resin | 90 | 89 |
| Recyclate | 10 | 10 |
| Calcium Carbonate | 0 | 1 |
| PROPERTY | % RETENTION | |
| | EXAMPLE 4 | EXAMPLE 5 |
| Tensile Strength | 82 | 100 |
| Tensile Elongation | 90 | 100 |
| Flexural Strength | 93 | 98 |

I claim:

1. A composition consisting essentially of:
   (a) 100 parts by weight of a thermoplastic resin comprised of a heat resistant polymer selected from the group consisting of (i) polyphenylene oxides, (ii) random styrenic copolymers comprised of, in polymerized form, 50 to 99 weight percent of a vinyl aromatic monomer, 1 to 30 weight percent of an unsaturated dicarboxylic acid derivative and 0 to 40 weight percent of a copolymerizable ethylenically unsaturated monomer, (iii) aromatic polycarbonates, (iv) styrene acrylonitrile copolymers, (v) acrylonitrile-butadiene-styrene polymers, and (vi) mixtures thereof, wherein at least a portion of said thermoplastic resin has been reclaimed;
   (b) from 0.01 to 5 parts by weight of a vinyl resin comprised of a vinyl chloride polymer; and
   (c) from 0.01 to 5 parts by weight of calcium carbonate, wherein calcium carbonate is present at a level at least equivalent to the concentration of vinyl resin in the composition.

2. The composition according to claim 1, wherein said calcium carbonate is in the form of fine particles having an average particle size from 0.07 to 100 microns.

3. The composition according to claim 2, wherein said vinyl chloride polymer is polyvinyl chloride.

4. The composition according to claim 3, wherein the thermoplastic resin is comprised of polyphenylene oxide and polystyrene.

5. The composition according to claim 3, wherein the heat resistant polymer is a random styrenic copolymer comprised of, in polymerized form, 3 to 25 weight percent maleic anhydride and 75 to 97 weight percent styrene.

6. The composition according to claim 3, wherein the random styrenic polymer is impact modified.

7. The composition according to claim 1, wherein said thermoplastic is a blend of reclaimed thermoplastic and virgin resin in a weight ratio from 0.1:99.1 to 20:80.

8. The composition according to claim 5, wherein said thermoplastic is a blend of reclaimed thermoplastic and virgin resin in a weight ratio from 0.1:99.1 to 20:80.

9. The composition according to claim 6, wherein said thermoplastic is a blend of reclaimed thermoplastic and virgin resin in a weight ratio from 0.1:99.1 to 20:80.

10. A method of enhancing the performance of a reclaimed thermoplastic resin contaminated with from 0.01 to 5 parts by weight thermoplastic resin, of a vinyl resin comprised of a vinyl chloride polymer, wherein the thermoplastic resin is comprised of a heat resistant polymer selected from the group consisting of (i) polyphenylene oxides, (ii) random styrenic copolymers comprised of, in polymerized form, 50 to 99 weight percent of a vinyl aromatic monomer, 1 to 30 weight percent of an unsaturated dicarboxylic acid derivative, and 0 to 40 weight percent of a copolymerizable ethylenically unsaturated monomer, (iii) aromatic polycarbonates, (iv) styrene-acrylonitrile copolymers, (v) acrylonitrile-butadiene-styrene polymers, and (vi) mixtures thereof; said method comprising incorporating 0.01 to 5 parts by weight calcium carbonate per 100 parts by weight of the reclaimed thermoplastic resin into said reclaimed thermoplastic resin wherein calcium carbonate is present at a level at least equivalent to the concentration of vinyl resin.

11. The process of claim 10 wherein the reclaimed thermoplastic resin contaminated with the vinyl resin is obtained by recycling of an interior automotive part.

12. The process of claim 11 wherein the interior automotive part is an instrument panel.

13. The process of claim 10 wherein the weight ratio of calcium carbonate to vinyl resin does not exceed 4:1.

14. The process of claim 10 wherein the particles are dry mixed with the calcium carbonate.

15. The process of claim 10 wherein the particles and the calcium carbonate are co-extruded and pelletized.

* * * * *